(12) United States Patent
Jarczyk

(10) Patent No.: US 8,044,827 B2
(45) Date of Patent: Oct. 25, 2011

(54) COMMUNICATION DEVICE AND METHOD FOR INPUTTING AND PREDICTING TEXT

(75) Inventor: Alexander Jarczyk, Freising (DE)

(73) Assignee: Qlsda Corporation, Taoyuan County (TW)

( * ) Notice: Subject to any disclaimer, the term of this patent is extended or adjusted under 35 U.S.C. 154(b) by 1456 days.

(21) Appl. No.: 10/596,339

(22) PCT Filed: Nov. 30, 2004

(86) PCT No.: PCT/EP2004/053180
§ 371 (c)(1),
(2), (4) Date: Aug. 24, 2006

(87) PCT Pub. No.: WO2005/059672
PCT Pub. Date: Jun. 30, 2005

(65) Prior Publication Data
US 2007/0089070 A1    Apr. 19, 2007

(30) Foreign Application Priority Data
Dec. 9, 2003 (DE) .................................. 103 57 475

(51) Int. Cl.
*H03K 19/00* (2006.01)
(52) U.S. Cl. ................ 341/22; 341/26; 341/34; 345/168
(58) Field of Classification Search .................... 341/22, 341/26, 34; 345/168; 715/261
See application file for complete search history.

(56) References Cited

U.S. PATENT DOCUMENTS

| 4,893,238 A * | 1/1990 | Venema ...................... 715/236 |
|---|---|---|
| 5,457,454 A * | 10/1995 | Sugano ........................ 341/22 |
| 5,574,482 A | 11/1996 | Niemeier |
| 5,623,406 A * | 4/1997 | Ichbiah ........................ 704/3 |
| 5,832,478 A | 11/1998 | George |
| 6,094,197 A * | 7/2000 | Buxton et al. ............... 715/863 |
| 7,098,896 B2 | 8/2006 | Kushler et al. |
| 7,250,938 B2 | 7/2007 | Kirkland et al. |
| 7,656,314 B2 * | 2/2010 | Muranaka et al. ............ 341/22 |
| 2005/0088415 A1 * | 4/2005 | To ................................ 345/168 |
| 2006/0007162 A1 * | 1/2006 | Kato .......................... 345/168 |

OTHER PUBLICATIONS

Sony Ericsson T200 User Manual, Aug. 2002—pp. 18-19.

* cited by examiner

*Primary Examiner* — Tuan T Dinh
*Assistant Examiner* — Hung Q Dang

(57) ABSTRACT

A communication device comprising an input device for inputting text character-by-character from a sequence of characters, a memory device for storing a plurality of reference character sequences of characters and a prediction device for comparing individual ones of the input characters with the reference character sequences and for proposing at least one of the reference character sequences after the inputting of individual input characters of the sequence of characters to be input in the case of a corresponding comparison result. The prediction device compares the input characters with not-immediately-adjacent characters of the reference character sequences. The input device may further a number of syllables or vowels between two input characters of the sequence of characters to be input and the prediction device compares the number of input syllables or vowels with corresponding numbers of syllables or vowels of the reference character sequences.

20 Claims, 3 Drawing Sheets

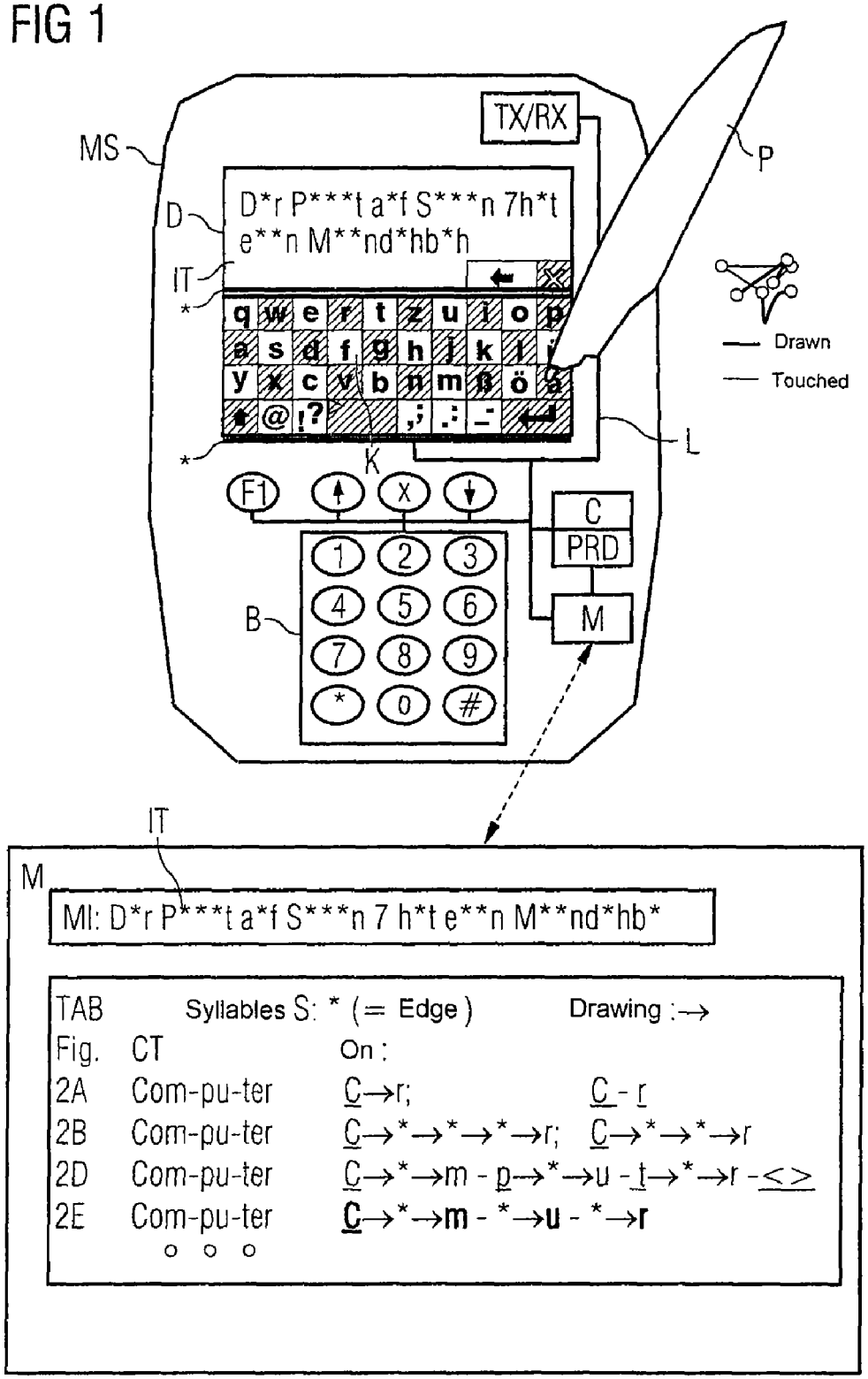

Com-pu-ter: „C*o*u*e*r"

Com-pu-ter: „C*o*u*e*r"

Com-pu-ter: „C*o*u*e*r"

COMMUNICATION DEVICE AND METHOD FOR INPUTTING AND PREDICTING TEXT

FIELD OF TECHNOLOGY

The present disclosure relates to a communication device for inputting and predicting text and to a method for inputting and predicting text into a communication device.

BACKGROUND

Current communication devices, particularly mobile radio devices, have an input device for inputting text character by character into the communication device, the text consisting of a sequence of characters. The communication devices usually have a memory device for storing a plurality of reference character sequences, the reference character sequences of characters comprising various words, in the manner of a dictionary, which are input relatively frequently. The communication device is capable of comparing individual ones of the characters input in succession with the reference character sequences of characters by means of a prediction device. As soon as the prediction device determines one or more of the reference character sequences with matching sequence of beginning characters to the input characters during the comparison, the prediction device proposes the corresponding reference character sequences so that the user of the communication device, in the case of a relevant proposal, no longer needs to input all of the further individual characters of the sequence of characters to be input but, instead, can select the corresponding proposal. After the complete text of usually a number of words has been input, the text is transmitted via a conventional interface of the communication device and, as a rule, via intermediate network facilities to a remote communication device of a third party and is there displayed after reception.

In a mobile radio device, the numerical keypad is normally used as input device, a number of letters and possibly special characters being allocated to each number. Modern mobile radio devices have as an alternative or additional input device a sensitive, mostly touch-sensitive, interactive display device. The display device is used, for example, for displaying a virtual keypad with letters as in the case of a computer keyboard. Individual ones of the letters displayed can be selected with the aid of a pen whereupon the letters selected are temporarily stored as current text input as input characters in a memory device of the mobile radio device. Furthermore, interactive input devices are known which have a surface on which it is possible to write with a pen. The written letters are converted into the letter code of the communication device with the aid of a method for character recognition and temporarily stored as the input characters of the text.

Such a text input via a keypad or with a pen on an interactive input and/or display device on mobile radio devices is slow and fatiguing because, for example, words used more frequently have to be input time and again in detail via character recognition or virtual keypads. Fatigue and impatience of the user occur especially with repeated inputting of text. For example, short messages according to SMS (Short Message Service) with questions "where are you?" or "when will we meet?" are frequently input. Apart from the need to be able to recognize individual words in a simple and efficient manner with the aid of a prediction device, such complex sentence structures must be input completely word for word, the prediction methods of the prediction device frequently requiring a multiplicity of characters to be input before an individual one of the words is proposed correctly. In such prediction methods, the cognitive load on the user during the selection from a list of proposals is also relatively high and tends to distract from the actual writing of words. In addition, the fewer the letters of the word that have been input, the higher the number of proposals with variants of reference character sequences with identical first input characters. It has been found that many users prefer to enter individual letters before having to continuously change to and fro between the input of the individual characters and the selection of a prediction.

Apart from the possibility of entering text via such an input device where text is input successively character by character, search machines are known from the field of computer databases, in which the search terms can be input by using dummy characters. For example, the character sequence "*br*n*" can be input with "*" as dummy character in order to have all words displayed which first contain the character sequence "br" at any position within the character sequence and then contain the character "n" at any subsequent position.

SUMMARY

Under exemplary embodiments disclosed herein, an improved communication device is disclosed for inputting and proposing text and a corresponding method for simplifying the input of text or, respectively, proposing an alternative method for predicting text.

Under a preferred embodiment, a mobile radio device comprises an input device for inputting text character by character from a sequence of characters, a memory device for storing a plurality of reference character sequences of characters and a prediction device for comparing individual ones of the input characters with the reference character sequences of characters and for proposing at least one of the reference character sequences after the inputting of individual input characters of the sequence of characters to be input in the case of a corresponding comparison result.

Under one embodiment, the prediction device is adapted for comparing the input characters with not directly adjacent characters of the reference character sequences. This provides the advantage of successively inputting significant characters of a word which enable the associated desired reference character sequence to be found particularly quickly in the memory device by means of the prediction device.

In this case, the prediction device is preferably adapted in such a manner that it compares the input characters with the first and the last character of the reference character sequences. In this case, the reference character sequence can be, for example, a complete word so that the characters input and to be compared are characters with the first and the last letter of the word to be found in the plurality of reference character sequences.

Furthermore, the respective reference character sequence can be formed by a single syllable or, in the case of a multi-syllable word, by a plurality of syllables. The prediction device is then advantageously adapted for comparing a plurality of input characters with the respective initial and end characters of a plurality of syllables of multi-syllables ones of the reference character sequences. Thus, only the first and last letter of the individual syllables of a word to be written need to be input in each case. Naturally, a further shortening of the input to in each case only the first and/or last letter(s) of each syllable can be advantageously realized, particularly in conjunction with the input of the first and/or last letter(s) of the word.

Under another embodiment, a communication device is disclosed comprising such an input device, such a memory device and such a prediction device that is advantageously constructed due to the fact that the input device is adapted for inputting a number of syllables with respect to two input characters of the sequence of characters to be input and the prediction device is adapted for comparing the number of input syllables with corresponding numbers of syllables of the reference character sequences. This enables, for example, a first and a last letter of a multi-syllable word and additionally the number of syllables of this word to be input, particularly in combination with the above embodiment. From a plurality of individual reference character sequences in each case forming a word, a large proportion which has a different number of syllables can thus be filtered out. The selection list, provided or proposed to the user, of reference character sequences with identical character sequence as during the input can be distinctly reduced correspondingly.

In this embodiment, the input device is expediently arranged as an interactive display device on which characters which can be input are displayed in a text input area and can be selected sensitively, particularly touch-sensitively, for inputting, the text input area exhibiting at least one syllable input area. The syllable input area is advantageously formed by at least one, or preferably two, opposite edge areas of the text input area. This provides for a drawing movement with an input pen of a first letter to one or both opposite edge areas as often as there are syllables until a concluding letter of the character sequence is approached. It is also definable generally to use as basis in a syllable mode that a syllable between two input letters or a first syllable is formed by these two letters so that the number of syllable input area contacts is reduced by one compared with the total number of syllables of the character sequence to be input. Furthermore, a special field (e.g., an operable key of the communication device) can also be adapted as syllable input area.

According to yet another embodiment, a communication device comprising such an input device, such a memory device and such a prediction device is advantageous independently or in combination with the other embodiments due to the fact that the input device is arranged for inputting vowels and the comparison device is adapted for comparing input vowels with a corresponding sequence of vowels in the reference character sequences. This makes use of the fact that the vowel structure in a word, particularly in a relatively long and multi-syllable word, when compared with the reference character sequences, in most cases supplies more unambiguous comparison results than in a comparison with the first two, three or four letters or in a comparison with the first and the last letter. The input is also facilitated for the user since the vowels are also simpler for users with spelling deficiencies since these intuitively input the correct vowels more readily than the correct consonants and input errors are thus avoided.

The embodiment of the input device and of the prediction device in accordance with the statements relating to the interactive display device is also advantageous where a vowel input area is provided instead of a syllable input area. Naturally, both a vowel and a syllable input area can be provided in a combined embodiment.

In cases when one or more vowel input areas are used, it is preferable if the input device exhibits an input key for inserting and removing the vowel input area or areas. The input key can be an independent key of an input device but can also be a regular key, for example a key from the numeric field of the conventional keypad of a mobile radio device.

The vowel input area is preferably inserted automatically when the first input character is a vowel or consonant and a drawing movement by the input device over the text field to further vowels to be input is detected. The insertion criterion can be, for example, the movement of an input pen or the like when it is drawn beyond a minimum required distance threshold in order to detect a movement as drawing movement. The vowel input area is then inserted only by moving the pen beyond a movement threshold, i.e. the vowel input area is not shown after clicking-on or touch-selecting but after the first possibly slight drawing or displacement of the pen. To avoid an excessively large text input area, an overlaying of the vowel input area over special characters can be advantageously realized so that special characters are overlaid which are not required for inputting a word.

The interactive display device as input device can preferably distinguish between touching and drawing movements during an input of characters. Characters are again understood to be the most varied characters, particularly vowels and consonants. In this manner, for example, syllable connections or vowel connections can be signaled by drawing movements whereas touching is used for identifying initial, intermediate or end letters. As a result, the user can also change to and fro between various input options of the various embodiments, or combine these, at any time.

In such a case, the prediction device is preferably adapted for using drawing movements between various characters of the text input area for identifying characters and possibly syllables of a single character sequence belonging together. The characters, particularly vowels and consonants, are preferably used only by moving the pen beyond a movement threshold in the case of a drawing movement.

In the case of an interactive display device, the syllable or vowel input area is preferably arranged to extend over two opposite edge areas of the text input area, and it is preferable if the outside edge sections of the edge areas extend further around the remaining text input area along the laterally adjoining edge areas. This enlarges the activation area for the individual syllable or vowel inputs.

The input device is preferably arranged for inputting a word completion character, particularly a punctuation mark or blank character, for identifying the end of a word.

The reference character sequence can be constructed not only from a single word and stored as such, but the reference character sequence can also be stored as a sentence or sentence part of a plurality of words and used for comparing and predicting a sentence or sentence part.

According to an exemplary method, test is inputted from a sequence of characters into a communication device, particularly into a communication device described in this manner, wherein a sequence of characters is input character-by-character by means of an input device and wherein, after at least two characters have been input, missing characters of the sequence of characters are predicted by means of a prediction device by comparison with reference character sequences stored in a memory if, during the prediction, the at least two input characters are processed as not directly adjacent characters of the reference character sequences.

During the comparing, the at least two input characters are advantageously processed as the first and the last character of a word and/or of a syllable of the sequence of characters. Additionally, the use of the number of syllables of the sequence of characters is also advantageous if the number of syllables is input and used during the comparison. Advantageously, a display device with a sensitive, particularly touch-sensitive, text input area, which is used for a character input, is provided for inputting the number of syllables, an area, particularly an edge area or two opposite edge areas of the text input area, being provided for inputting the number of syllables. The prediction for input characters and possibly a number of syllables of the sequence of characters is advantageously performed after the input of a completion character, particularly a blank character.

If an input with a pen on an interactive display device is specified, alternative input devices can also be correspondingly realized. On a touch pad, for example, a finger placed on it is used as input means instead of such a pen.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 1 shows components of a communication device in the form of a mobile radio device including a representation of exemplary memory contents;

DETAILED DESCRIPTION

Figure 2A:
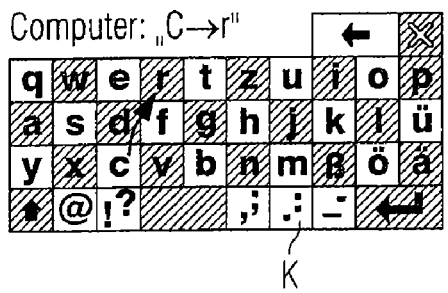
FIGS. 2A-2F show representations of text input areas of an interactive display device for illustrating various input methods for illustrative words to be input.

As can be seen from FIG. 1, a communication device MS includes of a plurality of individual components, only a part of which is shown which is advantageous for understanding the preferred embodiment of the communication device and of the procedure for inputting and for predicting text.

The communication device MS shown comprises a mobile radio device with a display device D which serves as an input device at the same time. In the exemplary embodiment shown, the display device D is constructed as an interactive display device on which characters which can be input are displayed in a text input area K and can be selected to be sensitive and particularly touch-sensitive for inputting. The text input area K shown includes a displayed sequence of characters and functions which could be input in, for example, the manner of a typewriter or computer keyboard, known per se, with a typical "qwertz" or "qwerty" letter arrangement. In addition, special characters and control characters required and/or frequently needed are shown. The user can touch-select characters with the aid of a pen P whereupon these are recognized as input characters by a control device C of the communication device MS and are permanently or temporarily stored in a memory device M.

In addition, the touch-selected characters are displayed on a part of the display device. A sequence of characters IT as input by way of example by the user is shown. An asterisk "*", which acts as a dummy character, is shown a number of times. According to a particularly preferred embodiment, each individual asterisk * stands for a syllable S of the text to be input.

To complete the words and/or sentences which have been input completely, a prediction device PRD is used which can be constructed as an independent device in the communication device MS. In the present exemplary embodiment, the prediction device PRD is functionally constructed by the correspondingly driven control device C.

In particular, the control device C can also be a central control device of the communication device MS which, apart from controlling actual functions of the communication device, also performs data and signal processing. To transmit data and signals, the control device C is connected with one or more lines L, possibly also busses, to the other devices or components of the communication device MS.

Apart from the display device D which is constructed as an interactive input device in the present case, the memory device M and the prediction device PRD, the control device C is also connected to a transceiving device TX/RX for forming an interface to external devices. In addition, further input devices in the manner of keys known per se are connected to the control device C. In particular, these are input keys of a keypad B with a numeric keyboard for inputting telephone numbers. This numeric keypad B can also be set up with input functions for inputting letters as is known per se. Correspondingly, such keys of a key input pad B can also be used for inputting text alternatively or additionally to an interactive display device D. A function key F1 for activating special functions is also shown. Instead of such a function key F1, a key of the keypad B, known per se, can also be set up with a corresponding additional function for corresponding inputs.

Apart from storing data for operating the communication device MS, the memory device M is also used preferably for storing input text from a sequence of characters IT in a first memory section MI. A second memory section TAB is used as database or table for the prediction device PRD. In the table TAB there are different words stored as reference character sequences CT. As an example, however, only the word "Computer" in the present case is stored in accordance with four different embodiments which are described with reference to FIGS. 2A, 2B, 2D and 2E. Additionally or alternatively, parts of sentences or entire sentences can also be stored as reference character sequences in the second memory section TAB if the prediction device PRD is to predict not only single words but parts of sentences or even entire sentences and to propose these to the user after the input of initial characters.

In the table forming the second memory device TAB, the reference character sequence CT can be stored in various manners. According to simple embodiments, only the words used frequently or normally during the use of such a communication device are stored. According to a more preferred embodiment, syllable information is additionally stored. The syllable information can be stored by storing the words as reference character sequences CT, separated syllable by syllable, for example by means of scores "-". Storing additional information in the manner of further columns is also possible. In the case of the syllable information, storing an algorithm is also possible which defines language rules according to which a conventional word must be subdivided into syllables by means of the prediction device PRD.

Apart from the possibility of temporarily storing a sequence of characters IT, which is to be input or has been input, in the first memory section MI and the preferably permanent storage of the reference character sequences CT in the second memory section TAB, the first and second memory sections MI, TAB being formed as part of the memory device M of the communication device MS, separate memory devices can also be provided for this data. For storing the reference character sequences CT, in particular, a further memory section or independent memory can be provided, in addition to a fixed memory with predetermined reference character sequences CT, in which further reference character sequences can be input by the user. As an alternative to a direct input of further reference character sequences CT by the user, an algorithm in the control device C can also perform an automatic analysis of input words and their storage as additional reference character sequences.

In the text which follows, various embodiments of preferred methods for inputting text line by line from a sequence of characters and for comparing individual ones of the input characters with the reference character sequences CT will be described in connection of FIG. 1 with other figures, and in the case of a positive result during the comparison, a prediction of the reference character sequences determined during the comparison will be performed. For this purpose, the prediction result is displayed to the user and, in the case of a number of possible prediction results, a selection list is displayed. Apart from the selection of one of the comparison results displayed, i.e. one of the reference character sequences displayed as the required word, the user can preferably perform further text inputs or character inputs if the required word is not found among the reference character sequences displayed as is known per se.

FIG. 2A shows an input by means of the interactive display device D, the text input area K being shown in the manner of a keypad, known per se. For example, the word "Computer" is to be input which, as a reference character sequence, is also stored as a reference character sequence CT in the memory device M or, respectively, in the second memory section TAB.

According to the preferred procedure, the input is to be effected by inputting first the first letter "C" and then the last letter "r" of the word "Computer" to be input. The prediction device PRD is then to search the table TAB for corresponding reference character sequences CT. Instead of the successive input of a word character by character from the first character via the second character of this word, the first and the last character of the word to be input are thus input by the user. In order to signal to the prediction device PRD that these two input characters belong to a word, the pen P is placed on the first letter "C" and drawn to the last letter "r" where it is lifted off.

As an alternative, successive selection of the two letters "C" and "r" is also possible and in this case a function key F1 or another key of the communication device MS is preferably kept pressed while the word is being input. As an alternative, a word completion character can also be input to signal the end of a word, for example by inputting a blank character or a punctuation mark.

Compared with the method for inputting the first and the last letter of a word to be input as is outlined in FIG. 2A and in row 2A of table TAB in FIG. 1, the possibility of inputting syllables also exists according to a preferred embodiment. Naturally, the input of syllables can also be used as an independent concept in conjunction with prediction methods known per se. Asterisks "*" mark the syllables in the figures and according to a first exemplary embodiment the number of syllables of a word is specified. According to FIG. 2B or column 2B from table TAB, respectively, in FIG. 1 three syllable inputs "***", together with the letters "C" and "r", are performed via the input device K.

According to a further embodiment, it can be generally assumed that each word has at least one syllable and accordingly the syllables to be input are reduced by one in order to simplify the input.

According to a particularly simple embodiment, the syllables can be input by a corresponding numeric key of the keypad B or by correspondingly displayed numeric digits by selecting the text input area K of the interactive display device D.

Figure 2B:
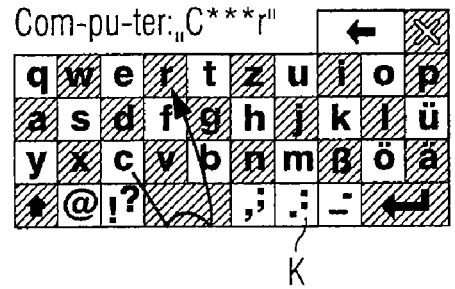
Figure 2C:
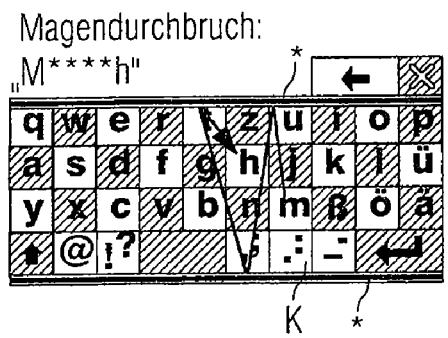

In the embodiment preferred according to FIG. 2B, the word "Computer" to be input is again input by inputting its first and its last letter "C, r", the pen P being placed onto the first letter "C" and drawn to the last letter "r", where it is lifted off. The drawing movement takes place from the first letter "C", touching the edge area * of the text input area "K" twice, each touching of the edge area * being detected as input of a syllable "*" by the control device C or the prediction device PRD. Thus, touching the edge area twice leads to the input sequence of the first letter followed by a total of three syllables and finally the last letter "C***r".

An embodiment in which two mutually opposite edge areas * of the text input area K are arranged for inputting syllables is particularly preferred. This makes it possible to draw to and from over the field of the text input area K with the pen P, starting from a first letter "M" to be input to the last letter "h" to be input, as a result of which the opposite edge areas * are in each case touched or traversed. Each touching or traversal signals a syllable "*" so that the exemplary word "Ma-gen-durch-bruch" (stomach perforation) is detected, e.g. in the form "M***h".

Figure 2D:
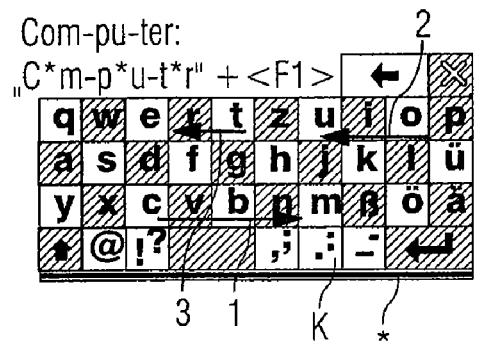

According to a further preferred embodiment which is outlined by means of FIG. 2D and row 2D of table TAB in FIG. 1, the input is effected in the form of a combination of the embodiments described above. According to this arrangement, the first and last letters of each syllable are input. In the example shown, in the case of the word "Computer" to be input, the pen P is first placed on the letter "C" and drawn to the letter "m" which corresponds to the last letter of the first syllable. The drawing movement signals the input of a coherent syllable *. After that, the pen P is placed on the first character of the second syllable "p" and drawn to the last character "u" of the second syllable, whereupon the pen P is placed on the first character "t" of the third syllable and drawn to its last character "r". In an input of this type, a function key "F1" or another key, e.g. the numeric key "1" of the keypad B, is preferably additionally pressed so that the control device C or the prediction device PRD, respectively, detects that several syllables have been input which belong to a single word.

The embodiments shown are thus preferably based on a fragmented input, i.e. the words to be input are input only partially. According to a first variant, only the initial letter and the end letter of the word to be input are input, for example with the pen P on the interactive display device B, K by placing the pen P, drawing the pen P over the text input area K and lifting the pen P off. Such an input results in a search definition "a*e", as it were, where "a" stands for an initial letter or initial character, "e" stands for an end letter or an end character and "*" stands for any intermediate letters or intermediate characters. With such an input with a drawing movement between the individual characters of a word to be input, the final lifting off signals at the same time a word completion character so that the input of a separate blank character can be omitted or is performed automatically by the control device C.

According to the second embodiment described, in addition to an initial character and an end character of the word to be input, its syllables or its number of syllables are input. According to the preferred embodiment, in the case of an input via an interactive display device, the input can be performed by a corresponding number of touch contacts of the edge area of the text input area K. In this process, the same number of arcs or a number of arcs correspondingly reduced by one are produced as there are syllables in the word to be input.

Naturally, the individual characters and syllables can also be input by individually selecting the individual characters to be input by means of the pen P on the interactive display device or via the keys of the keypad B, known per se. In this case, the end of a word or, in the case of a sentence to be predicted, the end of a sentence is signaled by a corresponding word completion character in the form of the blank character or of a punctuation mark. The input of the syllable information ultimately leads to a higher hit probability since, in addition to the input letters or characters, only those of the quantity of reference character sequences in which the corresponding number of syllables is present need to be taken into consideration during the comparison.

The individual variants can be combined with one another or with prediction methods known per se.

The prediction device PRD is thus used as a completion component in the system. The prediction device PRD can consider advantageously not only individual words but parts of sentences or entire sentences which are input by the user. On the one hand, this provides for an analysis with respect to a word actually to be predicted in that other words in the sentence can be checked with the view to a sensible combination of the reference character sequence within a sentence. It is also possible to supplement a suitable sentence by means of a characteristic word, e.g. "meet" in the manner "when and where can we meet?". Such frequently used sentences thus no longer need to be input completely. As well, parts of sentences can be predicted and used or proposed instead of entire sentences.

Optional configurations may be made, depending on the performance of the hardware used, where a return message about the best assumption of the prediction algorithm with respect to the word or sentence input, fragmented till then, would be displayed to the user during the input. The user can advantageously set a threshold value via which the reliability of a good comparison result is determined. When the threshold value is set high, this very advantageous option prevents proposals with a multiplicity of comparison results which predominantly do not apply. In combination with a syllable-by-syllable input, it can be determined, for example, that proposals are only made after characters of a number of syllables have been input, i.e. only when a relatively large number of input characters, i.e. especially letters and syllable information, has been input for comparison with the reference character sequences CT. Under a supporting embodiment, ranking is performed, if necessary, where the reference words assumed to be highest are displayed to the user listed from top to bottom in a correction list in accordance with their assumed hit probability for correction selection.

Figure 2E:
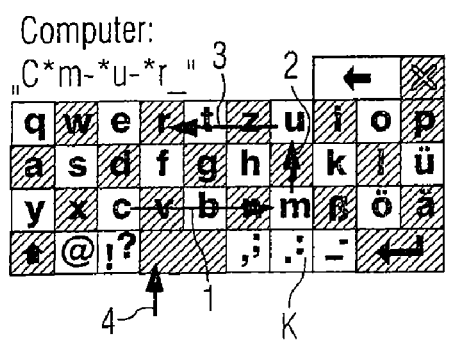

FIG. 2E shows a variant of the input by means of an interactive display device D or via a text input area K shown thereon, respectively. A syllable-oriented input is combined with an input method shortened further. The first character and the last character of the first syllable are input with a first drawing movement followed, by new selection, by a second drawing movement to the last character "u" of the second syllable. Following this, after lifting-off and again selecting with the pen P, a drawing movement is performed from this character "u" to the last character "r" of the third syllable of the word "Computer" to be input. Thus, only the last letter of each syllable is input. Finally, a blank character is input in order to signal the end of the word to be input to the prediction device PRD.

Figure 2F:
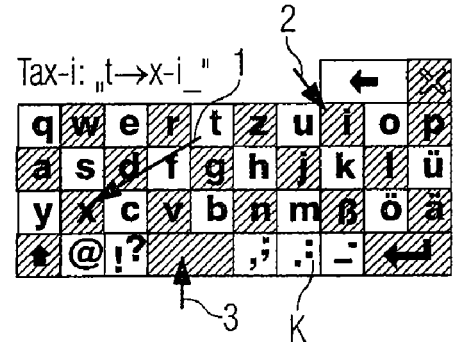

FIG. 2F shows a further variant in which a drawing movement is performed with a first drawing movement from a first character "t" to a last character "x" of a first syllable, whereupon from the second syllable, which only consists of a character "i", this character is input by selection. The end of the word "tax-i" to be input in this case is formed by a blank character input in conclusion. As an alternative to inputting terminating blank characters, other punctuation marks can also be input. It is also possible to press a key, for example a special function key F1 of the communication device MS whilst inputting a word so that ending the pressure on the key signals the end of the word.

According to a further embodiment, characters are input from a sequence of characters which form the text to be input, vowel by vowel or vowel-oriented. The corresponding embodiments, in turn, can be realized independently or in combination with the other embodiments described. As input, the vowels of a word to be input or of a sequence of words to be input are used. A combination, for example with the input of the first and the last characters of the word and/or the syllable position and/or the number of syllables can again be advantageously realized.

Figure 3A:
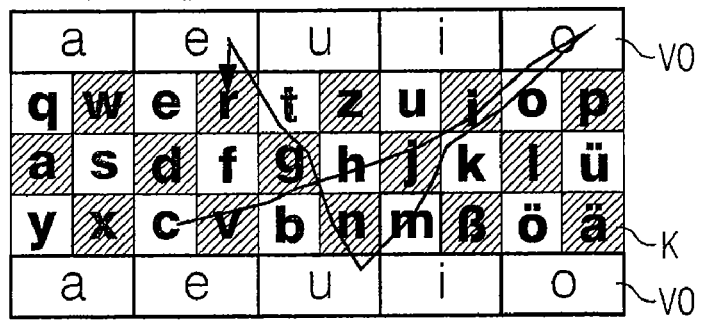
FIGS. 3A-3C show such representations of a text input area with sections for inputting vowels, additionally inserted in the edge area.

As can be seen from FIG. 3A, the vowels are preferably displayed in the edge area of the text input area K, particularly at the two edges. The vowel VO can be advantageously overlaid in such vowel input areas VO in a space-saving manner over punctuation marks and control characters which are not needed during the actual word input. The user can again signal to the system via a drawing operation that he wishes a fragmented syllable input. This intuitively enables the user to speak the syllables aloud or mutely and to input the respective vowel of a particularly fragmented syllable in alternation of drawing movements to the bottom and to the top. The vowels are advantageously positioned in accordance with the spatial order or arrangement on the actual QWERTY/QWERTZ keypad so that the user can easily find his way.

Figure 3B:
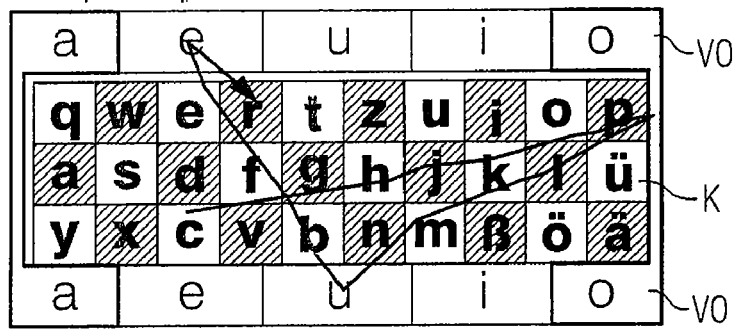
Figure 3C:
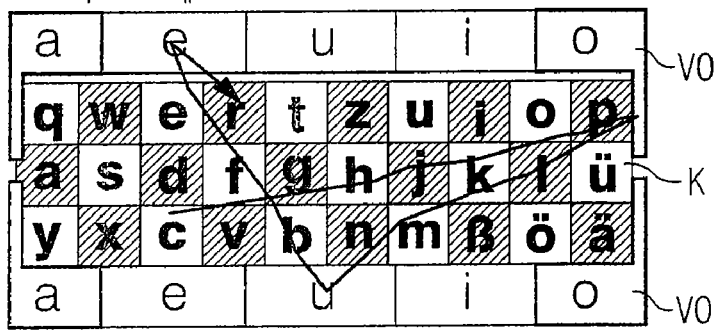

As can be seen from FIGS. 3B and 3C, according to alternative embodiments, the lateral edge area, i.e. the edge area which extends perpendicularly to the two edge areas with the overlaid vowels, is also advantageously arranged as a vowel input area VO. This lateral edge area can be arranged continuously or with an interruption. In the variant shown, the user, when inputting an "a" or a syllable which contains the letter "a", only needs to draw his pen P to the left, or, when inputting an "o" syllable only to the right. This possibility provides the advantage that only little space is needed at the edge area for the vowels in the edge section of the edge area, i.e. mainly the vowels "a, o", so that more space is available for the other vowels "e, u, i" in the edge area. As a result, the user can perform inputs with rapid and correspondingly rough drawing movements.

Combining a usual text input area K on the interactive display device D with additional interactively operable display of the vowel at the edge area provides the advantage of a combined input of consonants and possibly vowels in the usual manner via the interactive keypad displayed, in conjunction with inputting vowels. Vowels can be advantageously input in the drawing operation for inputting and signaling syllables, already described. In particular, the user is capable of changing to and fro between various input options of drawing movements and touching movements or combining these, respectively.

According to a variant of the input of characters, a connection of an input via the interactive input device D and a key 1 of a key input pad or a special function key F1 is performed. A first character is input by lowering the pen P onto the key input area K and pressing the keys 1, F1. After the key has been released, the selected character is correspondingly detected as character to be input and transferred into the first memory section MI. This method is repeated until the word to be input has been completely written. If, in contrast, the pen is moved to another character without lifting the pen P before the finger pressing the key is lifted, this character approached by the drawing movement is detected as the next character of the word defined in a fragmented manner and transferred into the first memory section MI. If more than two characters, for example, more than the start and end of the word to be input, are to be input in a fragmented manner, the pen P is lifted at the second to penultimate character, and lowered again during the pressing of the key 1 or F1, respectively. The fragmented character is then complete with regard to its input when the key 1 or F1 is released. If the key 1 or F1 is released, either the character has been written which has previously been pressed, if there has been no movement of the pen P, or a further character is input completely as last character of the word written incompletely if the pen P is moved from the first character to another. Identical characters can be input with a movement out of the character and back into the character or are initially set by lifting and lowering the pen until, for example, the pen leaves the character.

The communication device or its individual components, respectively, are correspondingly adapted for receiving the input characters, i.e. particularly letters, numbers and punctuation marks, but also syllable information, and for correspondingly processing these during the comparison with the reference character sequences.

In particular, the prediction device PRD is adapted for comparing the input characters C, *, r with not immediately adjacent characters C, r of the reference character sequences CT. During the comparison, the input characters are thus not compared with the reference character sequences in a manner known per se, i.e. a first input letter compared with its respectively first letter and a second input letter with its respectively second letter. Instead, according to the first embodiment, the first input letter is compared with the respectively first letter of the reference character sequences CT and the second input letter is compared with the respectively last letter of the reference character sequences CT in the second memory device TAB. According to the further embodiment, corresponding algorithms for comparing are provided. As well, the reference character sequences CT themselves can have markers, for example markers of the vowels or syllable information. It is also possible to use one or more further columns "one" with additional information, e.g. syllable information C→*→*→r, which are allocated to the individual character sequences of the reference character sequences CT.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A communication device comprising:
  an input device for inputting text character-by-character from a sequence of characters;
  a memory device for storing a plurality of reference character sequences of characters; and
  a prediction device for comparing individual ones of the input characters with the reference character sequences and for proposing at least one of the reference character sequences after the inputting of individual input characters of the sequence of characters to be input provides a corresponding comparison result,
  wherein the prediction device compares the input characters to characters that are not directly adjacent to the reference character sequences;
  wherein the input device is an interactive display device on which characters are displayed in a text input area and are touch-sensitively selectable for inputting, and wherein the prediction device uses drawing movement between various characters of the text input area for marking separated characters of a single coherent character sequence.

2. The communication device as claimed in claim 1, wherein the prediction device compares the input characters with the first and the last character of the reference character sequences.

3. The communication device as claimed in claim 1, wherein the prediction device compares a plurality of input characters with initial and end characters of a plurality of syllables of multi-syllable ones of the reference character sequences.

4. The communication device as claimed in claim 1, wherein the prediction device distinguishes between touching and drawing movements during an input of characters.

5. The communication device as claimed in claim 3, wherein the text input area comprises at least one syllable input area.

6. The communication device as claimed in claim 5, wherein the syllable input area is formed by at least one edge and of the text input area.

7. The communication device as claimed in claim 5, wherein the syllable input area is formed by two mutually opposite edge areas of the text input area.

8. The communication device as claimed in claim 5, wherein the syllable input area extends over two opposite edge areas of the text input area and extends further along the laterally adjoining edge areas from the outside edge sections.

9. A communication device, comprising:
  an input device for entering text character-by-character from a sequence of characters;
  a memory device for storing a plurality of reference character sequences of characters; and
  a prediction device for comparing individual ones of the input characters with the reference character sequences and for proposing at least one of the reference character sequences after the inputting of individual input characters of the sequence of characters to be input provides a corresponding comparison result,
  wherein the input device uses drawing movements to enter a number of syllables with respect to two input characters of the sequence of characters to be input, and
  wherein the prediction device compares the number of input syllables with corresponding numbers of syllables of the reference character sequences.

10. The communication device as claimed in claim 9, wherein the input device is an interactive display device on which characters are displayed in a text input area and are touch-sensitively selectable for inputting, and wherein the prediction device distinguishes between touching and drawing movements during an input of characters.

11. The communication device as claimed in claim 9, wherein the input device is an interactive display device on which characters are displayed in a text input area and are touch-sensitively selectable for inputting, and wherein the prediction device uses the drawing movements between various characters of the text input area for making or syllables of a single coherent character sequence.

12. The communication device as claimed in claim 9, wherein the input device inputs a word completion character for identifying the end of a word.

13. The communication device as claimed in claim 9, wherein the reference character sequence is stored as a sentence or part of a sentence of a plurality of words and is provided for comparing and predicting a sentence or part of a sentence.

14. A method for inputting text from a sequence of characters into a communication device comprising:
   inputting a sequence of characters character-by-character by means of an input device,
   wherein after at least two characters have been input, missing characters of the sequence of characters are predicted by means of a prediction device by comparing the characters to character sequences stored in a memory, and
   wherein during the prediction, the at least two input characters are processed as not-directly-adjacent characters of the sequence of characters;
   wherein a display device with a touch-sensitive text input area is used for a character input, and a drawing movement between various characters of the touch-sensitive text input area is for marking separated characters of a single coherent character sequence.

15. The method as claimed in claim 14, wherein during the comparison, the at least two input characters are processed as the first and the last character of a word or a syllable of the sequence of characters.

16. The method as claimed in claim 14, wherein a number of syllables of the sequence of characters is additionally input and used during the comparison.

17. The method as claimed in claim 14, wherein the display device with the touch-sensitive text input area is further provided for inputting a number of syllables to an edge area of the text input area, being provided for inputting the number of syllables.

18. The method as claimed in claim 14, wherein the prediction for input characters of the sequence characters is performed after the input of a completion character.

19. A communication device comprising:
   an interactive display device for displaying characters in a text input area and for touch-sensitively selectable inputting a sequence of characters by drawing movement between various characters of the text input area for marking separated characters of a single coherent character sequence;
   a memory device for storing a plurality of reference character sequences of characters; and
   a prediction device for comparing the sequence of characters to characters that are not directly adjacent to the reference character sequences and for proposing at least one of the reference character sequences after inputting the sequence of characters.

20. A communication device comprising:
   an interactive display device for displaying characters in a text input area and for touch-sensitively selectable inputting a sequence of characters by drawing movement between various characters of the text input area for marking separated characters of a word, wherein the sequence of characters are a portion of characters within the word and the first and the last character of the sequence of characters are the same to the first and the last character of the sequence of the word;
   a memory device for storing a plurality of reference character sequences; and
   a prediction device for comparing the sequence of characters to the stored reference character sequences and for proposing at least one of the reference character sequences after inputting the sequence of characters.

\* \* \* \* \*